(12) United States Patent
Geary et al.

(10) Patent No.: US 9,684,703 B2
(45) Date of Patent: Jun. 20, 2017

(54) METHOD AND APPARATUS FOR AUTOMATICALLY CREATING A DATA WAREHOUSE AND OLAP CUBE

(75) Inventors: Nigel Geary, Henley-on-Thames (GB); Beverley Jarvis, Camberley (GB); Chris Mew, Poole (GB); Helen Gore, Putney (GB)

(73) Assignee: PRECISIONPOINT SOFTWARE LIMITED, London (GB)

( * ) Notice: Subject to any disclaimer, the term of this patent is extended or adjusted under 35 U.S.C. 154(b) by 164 days.

(21) Appl. No.: 11/115,475

(22) Filed: Apr. 27, 2005

(65) Prior Publication Data

US 2005/0246357 A1 Nov. 3, 2005

Related U.S. Application Data

(60) Provisional application No. 60/566,366, filed on Apr. 29, 2004.

(51) Int. Cl.
*G06F 17/30* (2006.01)
(52) U.S. Cl.
CPC .............. *G06F 17/30592* (2013.01)
(58) Field of Classification Search
CPC ......... G06F 17/30457; G06F 17/30477; G06F 17/30489; G06F 17/3061; H04L 29/06; H04L 67/22; H04L 69/329
USPC ........................................ 705/26; 707/4, 200
See application file for complete search history.

(56) References Cited

U.S. PATENT DOCUMENTS

| | | | |
|---|---|---|---|
| 7,013,289 B2 * | 3/2006 | Horn et al. ...................... 705/26 |
| 7,181,450 B2 * | 2/2007 | Malloy et al. ..................... 707/4 |
| 2002/0194167 A1 | 12/2002 | Bakalash et al. |
| 2002/0198976 A1 * | 12/2002 | Davenport .............. H04L 29/06 709/223 |
| 2003/0229652 A1 * | 12/2003 | Bakalash et al. ............. 707/200 |
| 2005/0038721 A1 * | 2/2005 | Goeckel ................. G06Q 10/10 705/30 |
| 2005/0044015 A1 * | 2/2005 | Bracken ................. G06Q 20/04 705/30 |

OTHER PUBLICATIONS

Search Report under Section 17; Application No. GB 0409675.9; Date of Search Jul. 29, 2004; Claims Searched 1-7.
Search Report under Section 17; application No. GB 0508852.1; Date of Search Jun. 2, 2005; Claims Searched 1-32.
AnalySoft—London, England and Irvine, California; Nov. 11, 2003—"Analysoft Announces Adaptive Analytic Warehouse for Microsoft Business Solutions—Navision" AnalySoft Newsletter.

(Continued)

*Primary Examiner* — Son T Hoang
(74) *Attorney, Agent, or Firm* — Saul Ewing LLP

(57) ABSTRACT

A data warehouse design that combines data from multiple source ledgers or modules is constructed and from that an associated, single physical Star or Snow-Flake schema and OLAP hyper-cube analytic structure is generated to enable cross-functional analysis of any those multiple source ledgers or modules. The step of constructing the data warehouse or the step of generating the associated OLAP cube is achieved without significant human intervention using software.

26 Claims, 8 Drawing Sheets

(56) References Cited

OTHER PUBLICATIONS

AnalySoft—"AnalyServer is an adaptive analytic data warehouse for mid-marker ERP systems from Microsoft Business Solutions. With AnalyServer business users can exploint the full power of Microsoft's data warehousing architecture without the need to become an expert in business intelligence or paying expensive consultants to build and maintain a custom data warehouse" AnalySoft Newsletter.

* cited by examiner

ERP System (Staging Tables) Data Warehouse

Sales Invoice

General Ledger

Invoice Detail

Data Warehouse

Figure 5

```
PO #:      01234567                              Date: 04-Apr-04
Customer:  Acme Industries, Inc.
```

| Qty | SKU | Description | Unit Cost | Price |
|---|---|---|---|---|
| 120 | A347904-X | Right-handed widget stripper | 3.79 | 454.80 |
| 6 | M7828890 | Pre-formed widget molds | 8.49 | 50.94 |
| 3 | PS-1190-4G | 1 gallon mold release wax | 22.99 | 68.97 |
| 50 | TP-440-G-3 | Widget seals | 0.25 | 12.50 |
|  |  | Total |  | 587.21 |

Figure 6

| Date | Doc No | Doc Type | GL Account | Amount |
|---|---|---|---|---|
| 04-Apr-04 | 01234566 | INVOICE | Revenue | 241.17 |
| 04-Apr-04 | 01234567 | INVOICE | Revenue | 587.21 |
| 04-Apr-04 | 01234568 | INVOICE | Revenue | 377.13 |

Figure 7

| Doc No | Date | Customer | Qty | SKU | Description | Unite Cost | Price |
|---|---|---|---|---|---|---|---|
| 01234566 | 04-Apr-04 | DWPL | 48 | B5641-Y | Double sided flange | 5.02 | 241.17 |
| 01234567 | 04-Apr-04 | Acme Industries, Inc. | 120 | A347904-X | Right-handed widget stripper | 3.79 | 454.80 |
| 01234567 | 04-Apr-04 | Acme Industries, Inc. | 6 | M7828890 | Pre-formed widget molds | 8.49 | 50.94 |
| 01234567 | 04-Apr-04 | Acme Industries, Inc. | 3 | PS-1190-4G | 1 gallon mold release wax | 22.99 | 68.97 |
| 01234567 | 04-Apr-04 | Acme Industries, Inc. | 50 | TP-440-G-3 | Widget seals | 0.25 | 12.50 |
| 01234568 | 04-Apr-04 | H Hart & Sons | 7500 | W-00341-1 | 1 inch washer | 0.05 | 377.13 |

Figure 8

| Date | Product | Doc No | Type | Qty | Cost Amount |
|---|---|---|---|---|---|
| 04-Apr-04 | B5641-Y | 01234566 | SALES | 48 | 104.68 |
| 04-Apr-04 | A347904-X | 01234567 | SALES | 120 | 198.40 |
| 04-Apr-04 | M7828890 | 01234567 | SALES | 6 | 18.49 |
| 04-Apr-04 | PS-1190-4G | 01234567 | SALES | 3 | 30.54 |
| 04-Apr-04 | TP-440-G-3 | 01234567 | SALES | 50 | 4.98 |
| 16-Apr-04 | TP-440-G-3 | 01234567 | ADJUSTMENT | 0 | 0.12 |
| 04-Apr-04 | W-00341-1 | 01234568 | SALES | 7500 | 156.31 |

Figure 9

| Date | Product | Customer | Doc Type | Doc No | Account | Qty | Unit Cost | Amount |
|---|---|---|---|---|---|---|---|---|
| 04-Apr-04 | B5641-Y | DWPL | INVOICE | 01234566 | Revenue | 48 | 5.02 | 241.17 |
| 04-Apr-04 | A347904-X | Acme Industries, Inc. | INVOICE | 01234567 | Revenue | 120 | 3.79 | 454.80 |
| 04-Apr-04 | M7828890 | Acme Industries, Inc. | INVOICE | 01234567 | Revenue | 6 | 8.49 | 50.94 |
| 04-Apr-04 | PS-1190-4G | Acme Industries, Inc. | INVOICE | 01234567 | Revenue | 3 | 22.99 | 68.97 |
| 04-Apr-04 | TP-440-G-3 | Acme Industries, Inc. | INVOICE | 01234567 | Revenue | 50 | 0.25 | 12.50 |
| 04-Apr-04 | W-00341-1 | H Hart & Sons | INVOICE | 01234568 | Revenue | 7500 | 0.05 | 377.13 |

Data Warehouse  OLAP Cube

METHOD AND APPARATUS FOR AUTOMATICALLY CREATING A DATA WAREHOUSE AND OLAP CUBE

CROSS REFERENCE TO RELATED APPLICATIONS

This application claims the priority of provisional U.S. application Ser. No. 60/566,366 filed on Apr. 29, 2004 and entitled "Method and Apparatus Form Automatically Creating a Cross-Functional Data Warehouse and OLAP Cube" by Nigel A. Geary and Beverley Jarvis, the entire contents and substance of which are hereby incorporated in total by reference.

BACKGROUND OF THE INVENTION

1. Field of the Invention

This invention relates generally to systems and methods for analyzing and extracting data from Enterprise Resource Planning (ERP) or other, business software systems, and replicating that data over computer networks into other systems, specifically data warehouses and/or data marts and on-line analytical processing (OLAP) systems, for the purpose of effectively analyzing and creating reports using that data.

Specifically, one implementation of the present invention is a system and method for automatically analyzing the form and structure of the data within an ERP system and determining the appropriate metadata and data to be replicated and aggregated from that system to a separate data server, in order to construct a data warehouse and an associated OLAP cube without significant human intervention. The structure of the resulting data warehouse and OLAP cube permits cross ledger analysis and reporting against both summary and detail transactional data from the source ERP system simultaneously.

2. Description of Related Art

Almost any organization of any substantial size uses a commercial ERP (Enterprise Resource Planning) system, in which their day-to-day operational transactions are collected, stored, processed and managed. ERP systems are multi-module software applications which allow management of the important functions within an organization, including parts purchasing, maintaining inventories, interacting with suppliers, providing customer service, and tracking orders, among others. Almost all such systems incorporate a series of commonly-used financial accounting ledgers, i.e. a General Ledger (GL) and subledgers (for example, accounts receivable, accounts payable, inventory, fixed assets, and so on). A ledger is a classification and summarization of financial transactions, and includes the general ledger, legally required for audits. The term 'ledger' used herein includes subledgers. ERP systems often (although not always) use a relational database system to store their data.

In general, an ERP system is mainly a transactional system, i.e. one that is designed to perform transactions; for example, when a purchase order is received from a customer. Transactional systems are structured and organized so that these types of transactions can be performed as rapidly and reliably as possible with the large volumes of data that they require. However, the essential structure and organization of transaction systems make them poorly suited for analyzing the data they hold and reporting against it in certain ways, such as are typically required to effectively and efficiently manage a business. In addition, ERP systems are "mission-critical", in that they are vital to running the organization's business and so their performance cannot be impacted by also using them for other tasks (such as analysis and reporting). To circumvent these issues, many organizations separate their analysis/reporting systems from their transaction systems by replicating key transaction data from their ERP systems (and possibly also other databases) and storing them in a data warehouse or data mart.

A data warehouse typically contains a summary snapshot of an organization's transactional data at a single point in time, and this data is organized in such a way as to make it well suited for management analysis and decision making. This snapshot of data in the data warehouse is created by manual or automatic replication of a subset of the data in one or more external transaction systems (such as an ERP system). In addition, the data is often summarized across certain dimensions (operational facets) of the data, such as time, product, customer, location, etc., to provide summary information in a form which more accurately reflects the structure of the organization than the data in an ERP system.

Data marts are essentially structurally identical to data warehouses, except they are usually smaller and only contain data relevant to a narrow segment or specific functional area of the organization. Both data warehouses and data marts typically use a relational database system for data storage. Data marts are most useful for "stovepipe" analysis (i.e. for a specific subject area not linked to other business functions), and are ideal in such situations because they are faster and easier to create than a data warehouse; however as a result they are not as well suited for cross-functional analysis and reporting.

Despite their advantages stated above, data warehouses are still not ideally suitable for easily creating queries to answer the kind of real business questions used in management decision making (often called business intelligence). This is because a significant requirement of the end users asking such business questions is the ability to create their own ad-hoc analytical queries and reports using common business terms; however data warehouses are built on relational databases and so utilize very technical concepts such as tables, fields and views. In addition, data warehouses usually require the use of a complex query language, e.g. SQL (Structured Query Language) to access the data. None of these concepts are at all intuitive to non-technical end users.

So for example, a business may sell a wide variety of products in different regions over some period of time. In a simple transactional system, sales data might be stored as individual data records, each representing a sale to a customer on a particular date (time period), and linked to records in other tables containing the customer's address (geographic location), the details of the products sold (product), and other information. In a data warehouse the same data would be stored in a large central fact table, containing a series of records containing the aggregated value of all sales to each specific customer for each specific product in each specific region over each time period (for example individual months), together with summary totals for each grouping of customer, product, region, and time period. Each record in the fact table also contains a set of key values, each of which references a separate dimension table containing the descriptive business terms associated with the key values (e.g. the product names or geographic regions). These descriptive business terms are sometimes referred to as members or member names. The fields in the fact table which contain numerical values to be aggregated are referred to as measures. Measures are the central values of a cube that can be analyzed by the dimensions and hold the figures that the end user is primarily interested in. Some common measures are sales amount, cost amount, sales quantity. The structure of a data mart with a central fact table joined to separate dimension tables is referred to as a star or snowflake schema.

In the above example, joining the fact tables to one or more dimension tables to get a meaningful result is a non-trivial process, and as a result is difficult for the average end user, as well as hard to perform programmatically in a generalized way. Performing even more complex joins may even result in a query which takes an inordinately long time to complete and so significantly degrades system performance. Further, the process of aggregating data from potentially millions of transaction records derive sub-totals and totals for every combination of product, regions and customer, etc is difficult and inefficient in a relational database. Consequently, an additional type of data storage system is often created which represents the warehouse data in the form of the business terms rather than the underlying database format. Such systems are called on-line analytical processing (OLAP) systems.

In an OLAP system, each dimension is represented in the OLAP system's data structures (often referred to as a cube), together with the elements of that dimension. In addition, each dimension may contain a series of hierarchical levels; for example, in a time dimension that might be years, quarters, and months. All these dimensions, member names and hierarchies are collectively known as "metadata", and are typically stored within the OLAP system so that they can be referenced much more intuitively for business analysis and reporting purposes by non-technical users.

OLAP systems are therefore commonly used to facilitate the efficient retrieval and analysis of the information in data warehouses and data marts. These OLAP systems permit the rapid and effective creation of ad-hoc management analyses and complex summary reports from a number of different perspectives, which would be impossible, inefficient and/or too cumbersome with transactional systems.

A side benefit of OLAP systems is that they make it impossible for a naïve end user to accidentally (or maliciously) create a "runaway query", i.e. one which generates a complex, multi-table join that takes an enormous amount of time and system resources to complete (degrading the performance of the entire system).

Because data warehouses and data marts (and sometimes OLAP systems) typically use relational databases as their storage mechanisms, the principal way in which their data is usually accessed is by using SQL (Structured Query Language). SQL is a sophisticated and complex query language, which can be used to define the tables and fields of a database; create, modify or delete the data records; or extract data via queries. In addition, some relational databases permit the creation of stored procedures (essentially predefined SQL programs which can be saved in the database). Just as with procedure calls in any other programming language, stored procedures can be passed arguments and return values, so they can be used to perform complex programmatic tasks.

Those familiar with the theory and practice of this art will recognize that constructing such data warehouses and OLAP systems is a complex and difficult process, requiring much experience and skill; both with the technical issues in using a relational database, but also with the business knowledge to selecting the appropriate business terms, hierarchies and aggregations to facilitate the kind of reporting required. Automating such a process is often complex and error-prone, but can potentially yield significant organizational benefits by increased efficiency, reduced cost and eliminating human error.

However, there are also some limitations to the kinds of analysis that can be performed using traditional data warehouses and OLAP systems. These include:

Because of size, space and complexity constraints within the database, it is often very difficult to construct a data warehouse which combines all the data which may be required from separate ERP modules into a single data warehouse and OLAP cube. The usual solution is to use separate data marts and/or cubes; however, this approach makes certain kinds of cross-functional analysis and reporting very difficult to perform. For example, with separate data marts and/or cubes it would be very difficult to produce a report which enables users to drill from GL sales numbers to a breakdown of those sales by customer and then further by location and/or by item within that customer. The user may also want to drill to customer orders not yet invoiced or fulfilled and then to review the customer's outstanding account balance. Supporting this kind of drillthrough requires access to summary and detail data from a range of ERP modules, including the GL, Accounts Receivable, order entry and inventory control. Data warehouses and OLAP cubes typically contain only summary and aggregate data, making certain kinds of detail level analysis and reporting impossible. To circumvent this, many systems include the ability to drillthrough from the summary data values into the individual transaction records (or some subset of them) which make up those values in order to facilitate detailed level analysis; however, such functionality is usually very inefficient (requiring linking across different systems) and is very hard to provide in a generalized and useful way across all the data in the warehouse without making the data set unmanageably large.

To avoid displaying incorrect data values, many data warehouses only reference data within the ERP ledgers that has already been posted to the General Ledger (GL), making it difficult, for example, to track information about unshipped orders or unpaid invoices. Again, this would require access to the detailed transactional data.

When updating a data warehouse or an OLAP cube, typically a significant amount of human intervention is required to make decisions about the placement and structure in the dimension hierarchies of new or changed metadata items in the ERP system.

There is therefore a clear requirement for an invention that will help to address the above limitations within existing data warehouses and OLAP systems within an organization in an efficient and practical way.

SUMMARY OF THE INVENTION

In a first aspect, there is a method of analysing data from multiple source ledgers or modules; comprising the steps of:
(a) constructing a data warehouse that combines data from multiple source ledgers, sub-ledgers or modules;
(b) generating an associated, single physical OLAP cube to enable cross-functional analysis of any those multiple source ledgers or modules.

The present invention is based on the insight that the technical bias against generating data warehouses (e.g. with a star or snowflake schema structure) and large OLAP hyper-cube analytic structures ('OLAP cubes') from multiple source ledgers is not well founded. Previously, the norm has been to generate a single physical OLAP cube for each individual ledger/sub-ledger—hence one for the General Ledger, a further one for sales order processing etc. This prior art approach makes cross functional analysis of multiple source ledgers difficult since it requires the creation of a further level of physical or virtual cubes across multiple physical cubes and complex querying. Building such as network of interconnected small cubes is not only expensive to customize and maintain but is also not very intuitive or flexible for the business end-user. These disadvantages are overcome by the present invention.

A brief comment on terminology: A 'physical' OLAP cube stands in contrast to a virtual cube (physical cubes hold their own data; virtual cubes do not and are merely views onto other cubes). The term 'data warehouse' includes within its scope a data mart.

In one implementation, the step of constructing the data warehouse or the step of generating the associated OLAP cube is achieved without significant human intervention using software. This data warehouse that can be constructed using software is a generic warehouse that is capable of being customised when installed by an end-user. Similarly, the OLAP cube that is generated using software is a generic OLAP cube that is capable of being customised without technical knowledge of the software or data structures. This enables a software package to be used without detailed (or indeed any) guidance from costly consultants: previously, even constructing multiple physical cubes could require substantial expert consultant involvement in custom designing the warehouse and cube. But with the present invention, an OLAP cube that enables cross-functional analysis of multiple source ledgers or modules can be automatically generated—i.e. without significant human intervention at all.

In an implementation, the OLAP cube is based on a central fact table in the data warehouse that also holds some summary information. The central fact table is created using SQL joins from multiple input ledgers or modules to generate additional, detail rows in the central fact table.

The SQL joins can be made between source ledgers or modules, such as:
 (a) General Ledger and inventory/stock
 (b) General Ledger and sales purchase ledger
 (c) General Ledger and invoice/credit (sales order processing).

Another feature is that orders and other entries that do not have a financial impact to the general Ledger can be placed into the central fact table.

Fields in data warehouse tables can be dynamically updateable, in that these fields can change in accordance with the underlying ERP accounting or business structure and data when the warehouse is updated with a new snapshot of ERP system data.

A key to implementing this is the use of stored procedures in the software. The stored procedures can be defined in an XML file; the XML file includes SQL scripts and script templates. These stored procedures are executed in the data warehouse against the source ERP database to determine the various metadata structures required to create or update an OLAP cube to facilitate analysis and reporting of the data. More specifically, the stored procedures can execute queries to determine and identify one or more of the following metadata in the data warehouse:
 (a) The dimension names
 (b) The fields containing the member names for each dimension
 (c) The hierarchies of the members in each dimension An application of the invention can use a file containing instructions for creating multiple stored procedures which, when executed, initiate and control the process whereby the relevant and appropriate data is extracted from an ERP system into the data warehouse and the OLAP cube. The stored procedures initially exist in the file in a generic state, but their structure is changed dynamically at runtime, according to the responses given by a user during installation of the application. The application determines dynamically (by executing appropriate queries) and utilizes during the installation process, one or more of the following:
 (a) The ERP system product version;
 (b) The table/field naming convention used;
 (c) Any other naming differences between product versions;
 (d) The number of levels of totaling within the account hierarchy (and advanced dimensions);
 (e) The granularity of financial periods used, e.g. years/months vs. weeks & quarters.
 (f) Internal programming and option switches within the XML file;
 (g) External switches in an external license key file.

The stored procedures can take as parameters a list of new fields to be added to the data warehouse and the stored procedures then loop through this list of new fields and add them in to the correct tables in a star schema in the data warehouse. An application adds new dimensions (or measures of the dimensions) to the OLAP cube based on these new fields. This application can be written to loop multiple times through a series of scripts to create multiple sets of stored procedures, altering each set of stored procedures slightly on the basis of the structures and data in the ERP system.

When a periodic update is automatically triggered, the application will execute certain stored procedures which will scan through an ERP ledger data and recreate the data warehouse, and refresh the data in the OLAP cube.

A validation process can also be incorporated: in order to ensure that all the ledger information has been combined correctly, there are stored procedures which check the resulting account balances in the data warehouse or mart against the equivalent balances in the ERP system. The results of the error checking can be reported over the Internet to an implementation or support team via a Diagnostic Support Web Service.

The present invention enables the following types of reporting or analysis to be performed:
 (a) Product/Customer/Salesperson analysis against the Chart of Accounts
 (b) Aged Credit and Aged Debt comparison to obtain overall health of company
 (c) Complete Item/Customer profit margin calculated including adjustments, cost of materials and indirect costs—i.e. true margin as compared to estimated margin.
 (d) Dashboard style information on each customer including outstanding orders, debt, invoice history, suppliers and warehouses used to fulfill orders.
 (e) Full product analysis including orders, stock, previous sales, cost adjustments etc
 (f) Discount analysis by product/customer/salesperson.
 (g) Status of orders, including quotes
 (h) Asset management
 (i) Cash flow planning and reporting
and an almost unlimited list of static or ad hoc reports and analyses which help an end-user business control and manage business performance.

The present invention is predicated on there being a single data warehouse and associated single, physical OLAP cube, as opposed to the large proliferation of cubes required in the prior art. Hence, for source ledgers, sub-ledgers or modules that relate to one type of information, the present invention allows just a single data warehouse and associated single, physical OLAP cube to be generated. An example of one type of information would be financial information. Another type would be CRM (customer relationship management). Another type would be Supply Chain Analysis. An implementation of the present invention would therefore have a single data warehouse and associated physical OLAP cube for all financial source ledgers, sub-ledgers or modules (the prior art would require a large number). Similarly, that implementation would have another, single data warehouse and associated physical OLAP cube for all CRM source ledgers, sub-ledgers or modules; and another single data warehouse and associated physical OLAP cube for all Supply Chain Analysis source ledgers, sub-ledgers or modules. Other types of information can be catered for with further single data warehouses and associated single physical OLAP cubes.

In other aspects, there is software adapted to perform the method defined above and computer hardware when programmed with this software.

These and other objects, advantages, and features of the invention are further discussed in the detailed description of an exemplary embodiment of the invention, which is described in conjunction with the accompanying drawings.

BRIEF DESCRIPTION OF THE DRAWINGS

FIGS. 5-9 show a specific simplified example of the data in the individual tables and ledgers from the example sales invoice presented in FIG. 4, above; in particular, FIG. 5 shows the sales invoice itself; FIG. 6 shows the information stored in the GL, FIG. 7 the information stored in the invoice detail ledger, and FIG. 8 the information stored in the inventory table; finally, FIG. 9 illustrates this information as stored in the data warehouse fact table;

FIG. 12 shows the screen to enter the ERP server and database name, user name, and password;

FIG. 13 shows the screen to enter the OLAP server name and database name;

FIG. 14 shows the selection of dimensions found in the ERP to include in the OLAP cube;

FIG. 15 illustrates configuring the day(s) and time to execute automatic periodic updates.

DETAILED DESCRIPTION OF AN IMPLEMENTATION OF THE INVENTION

As noted above, an implementation of the present invention is a system and method for automatically analyzing the form and structure of the data within an ERP system and determining the appropriate metadata and data to be replicated and aggregated from that system to a separate data server, in order to construct a data warehouse and an associated OLAP cube without significant human intervention. It will be clear to those skilled in the art that the system and methods employed in the preferred embodiment of the invention are unique and are a significant improvement over the prior art.

In an exemplary implementation of the present invention, the system is configured on a standard PC data server connected to a computer network, the data warehouse is constructed in Microsoft® SQL Server™, and the OLAP cube is constructed using Microsoft Analysis Services™. The ERP system holding the metadata and data for the process is Microsoft Business Solutions-Navision® on a separate data server.

Figure 1:
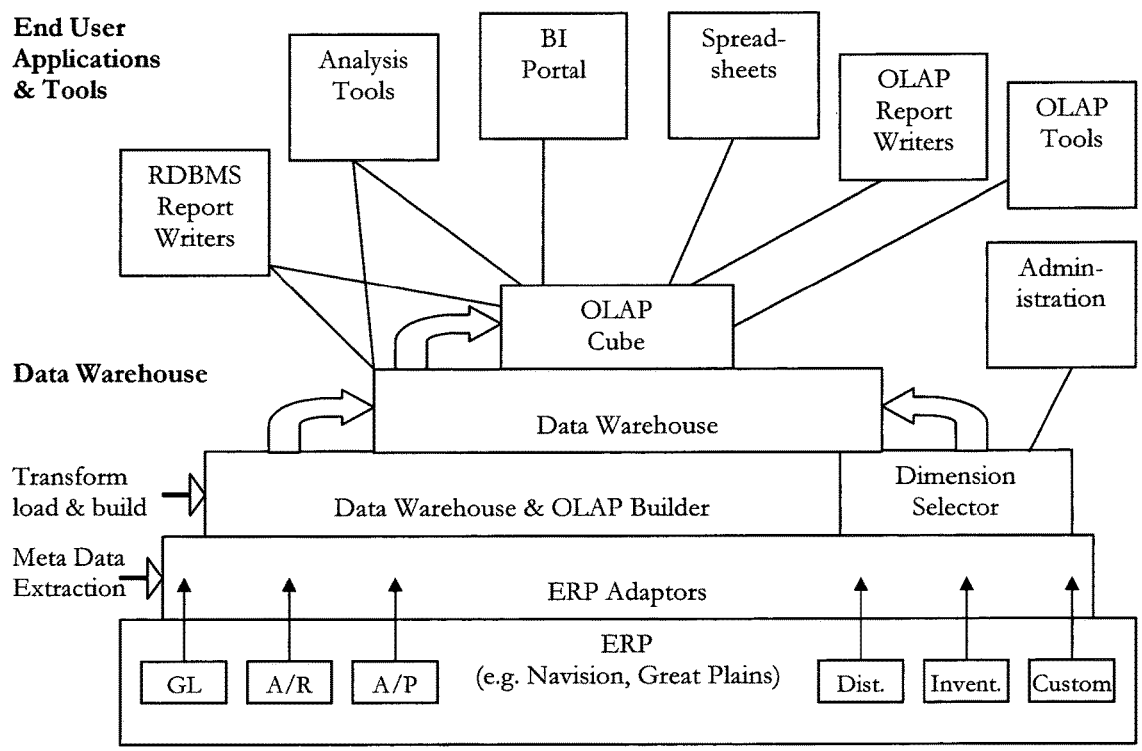
FIG. 1 is a schematic depiction of the system architecture for an exemplary implementation of the invention.

FIG. 1 describes an example of the overall system architecture of such an implementation. In this example, data is extracted from the various ledgers in the ERP system (i.e. GL, Accounts Payable, Accounts Receivable, etc.) via an ERP adapter (a programmatic interface for accessing the ERP data store) by a Data Warehouse & OLAP Builder program. This data is then used to construct a data warehouse, and subsequently an OLAP Cube. End user reporting and analysis tools (such as report writers, portals, spreadsheets, and so on) can then be used to extract, analyze and report against the data warehouse and/or the OLAP Cube.

Figure 2:
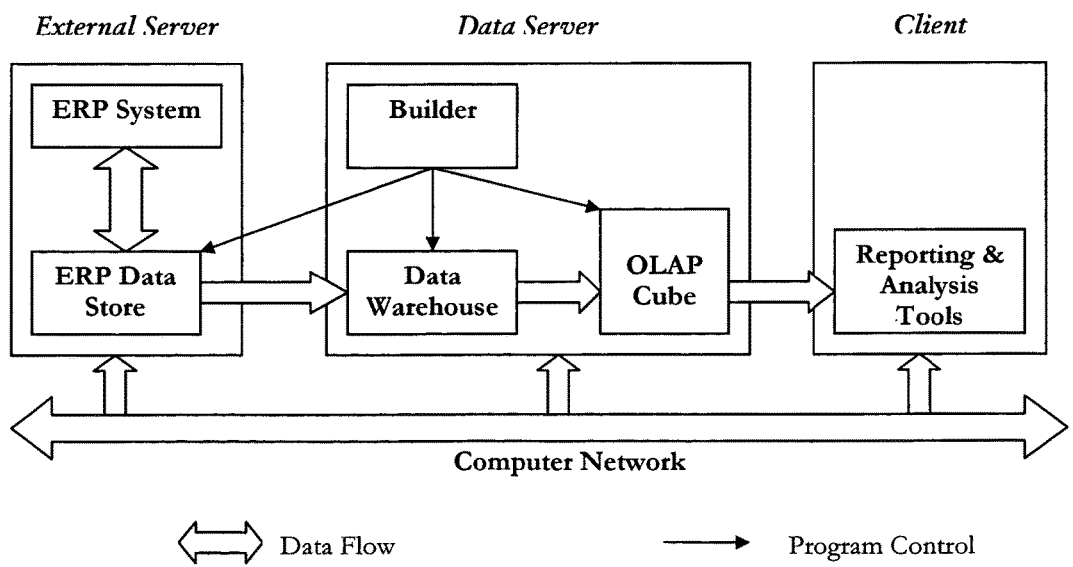
FIG. 2 depicts a data flow diagram for an exemplary implementation of the invention, showing data being extracted from the ERP system into the data warehouse and OLAP cube, and thence being accessed by end users.

FIG. 2 shows a summary data flow diagram for this exemplary implementation, in which ERP system data is extracted from the ERP data store on an external server into the data warehouse on another server via computer networks, under control of the Builder program. Some subset of this data is then used to construct the metadata and data in the OLAP Cube. Finally, multiple end users using multiple client computers can access the information in the data warehouse and OLAP Cube via the various reporting and analysis tools described above.

1. The Extraction Process to a Staging Database (for a Proprietary Based ERP System)

In one implementation of the present invention, whereby the data to be utilized from an external ERP system is stored within a native and proprietary database format (i.e. not a Microsoft SQL Server format), an initial process is performed to first extract the data into a SQL database to facilitate subsequent processing of that data. This is to ensure that the source data model remains consistent and so that SQL commands can be used for all subsequent access of the source data. In the event that the ERP system uses a Microsoft SQL Server environment for storing its data this extraction step in the process is not required.

In the instance when the ERP data is not already stored in a Microsoft SQL server environment, a series of stored procedures within the database are executed, which call the appropriate ERP adapter (a programmatic interface to the ERP system) to access the data. This process causes the ledgers in the ERP system to be duplicated by creating temporary staging tables within the database, and then causes the ERP ledger data to be copied to those temporary staging tables (see FIG. 3). In this exemplary implementation of the invention, the relevant ledgers in the ERP system which are copied are:

General Ledger (GL)
Accounts Receivable Ledger
Accounts Payable Ledger
Bank Account Ledger
Sales Order Processing
Purchase Order Processing
Fixed Asset Ledger
Inventory
Resource Ledger
Project (Job) Ledger
Budgets In addition, metadata and data from the ERP system which will eventually form the basis of the dimensional tables within the data warehouse (see step 2, below) is also copied into the staging database.

Figure 3:
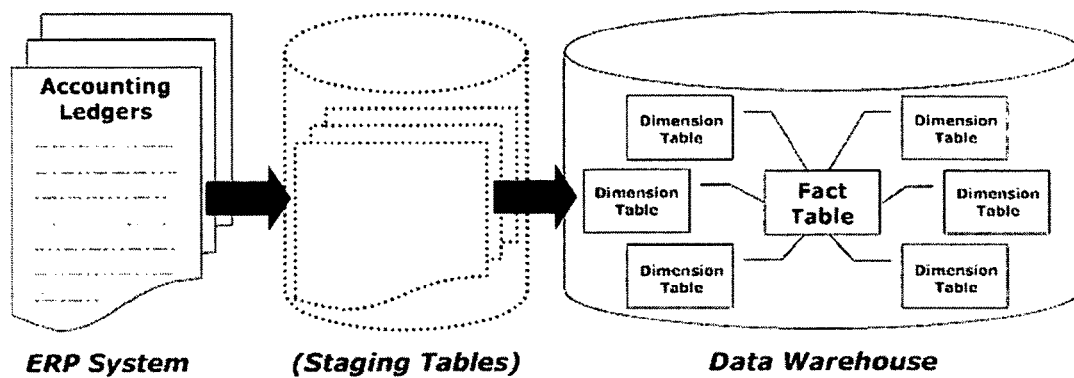
FIG. 3 shows steps 1 and 2 of the process, i.e. creating staging tables for the ERP data, then using the data in those tables to build the data warehouse.

FIG. 3 Illustrates this step in the process. Data in the ERP system ledgers is first extracted (if necessary) into a set of staging tables in the relational database, which essentially mirror the structure of the ERP ledgers. These staging tables are then used as a basis for creating the data warehouse (step 2, below).

It will be apparent to anyone familiar with the art that the ERP system used for this process as described above could be replaced by any one of a large number of ERP, financial or accounting software systems, such as Microsoft Great Plains®, Microsoft Axapta®, Oracle Financials®, Lawson Financial Suite®, and many others.

2. The Builder

In this exemplary implementation of the invention, the system includes an application whose function is to construct the data warehouse and OLAP cube. This application, known as the Builder, takes as input an Extended Markup Language (XML) file. This file contains instructions for creating over 200 stored procedures in the database which, when executed, initiate and control the process whereby at each stage the relevant and appropriate data is extracted from the ERP system into the staging tables, the data warehouse and the OLAP cube, as described herein.

The XML input file can be automatically downloaded from a Web Service every time that it needs to be read ensuring that the most up to date version is always in place.

The Builder is executed initially to install and configure the product, and also upon certain other significant transitional events (for example, after a version upgrade of the ERP system). When the Builder is executed it causes customized stored procedures to be created in the database. These stored procedures initially exist within the XML file in a generic state but the content of the stored procedures is changed dynamically at runtime, to customize them for each implementation.

There are two types of such customizations which occur in the stored procedures, these are static and dynamic. Static changes (for example, the substitution of server names, company names, etc.) occur throughout all of the stored procedures during the installation process, and become hard-coded when the stored procedures are inserted into the database.

Dynamic changes (changes that reflect the specific structure of the ERP, such as account totals or Advanced Dimensions in Microsoft Navision) mostly occur during execution of the stored procedures, and are managed using database cursors which adapt to changes in the data, and so change the execution path of the stored procedures. These dynamic changes are written in such a way that the behavior of the stored procedures changes at execution time. To illustrate this, in this example implementation, many of the stored procedures include a string parameter which is replaced at execution time with a string built according to the ERP data structures.

The Builder is also written to perform customization based on certain types of native structures from the ERP system into the data warehouse and OLAP cube. For example, in one particular implementation of the invention in which Microsoft Navision is used as the ERP system, the native structures provided within the ERP include Navision Advanced Dimensions Advanced Dimensions are custom structures which can be created within a Navision implementation. During the process of building (or rebuilding) the data warehouse and OLAP cube, the Navision database is interrogated to provide a list of any Advanced Dimensions which are defined. For each Advanced Dimension a dimension table and the associated keys within the fact table are created in the data warehouse (and optionally also the OLAP cube). During execution of the Builder program the end user has an opportunity to individually either include or exclude each Advanced Dimension from the cube. In the event that a new Advanced Dimension is created subsequently, the new Advanced Dimension will be automatically included in the data warehouse as described above; however, it will not also be included in the cube unless explicitly specified by the user.

The Builder is a programmable process in that the XML instructions are dynamically adapted to certain facets of the ERP installation. The Builder has a defined execution path that is dependent on the responses from the user during installation, and also on the results of executed queries performed during the process.

There are certain aspects of the ERP installation which the Builder determines dynamically (by executing appropriate queries) and utilizes during the installation process, e.g:
The ERP system product version
The table/field naming convention used
Any other naming differences between product versions
The number of levels of totaling within the account hierarchy (and Navision advanced dimensions)
The granularity of financial periods used, e.g. years/months vs. weeks & quarters Note that the last two aspects listed above are also redetermined and updated upon each periodic update.

Figure 15:
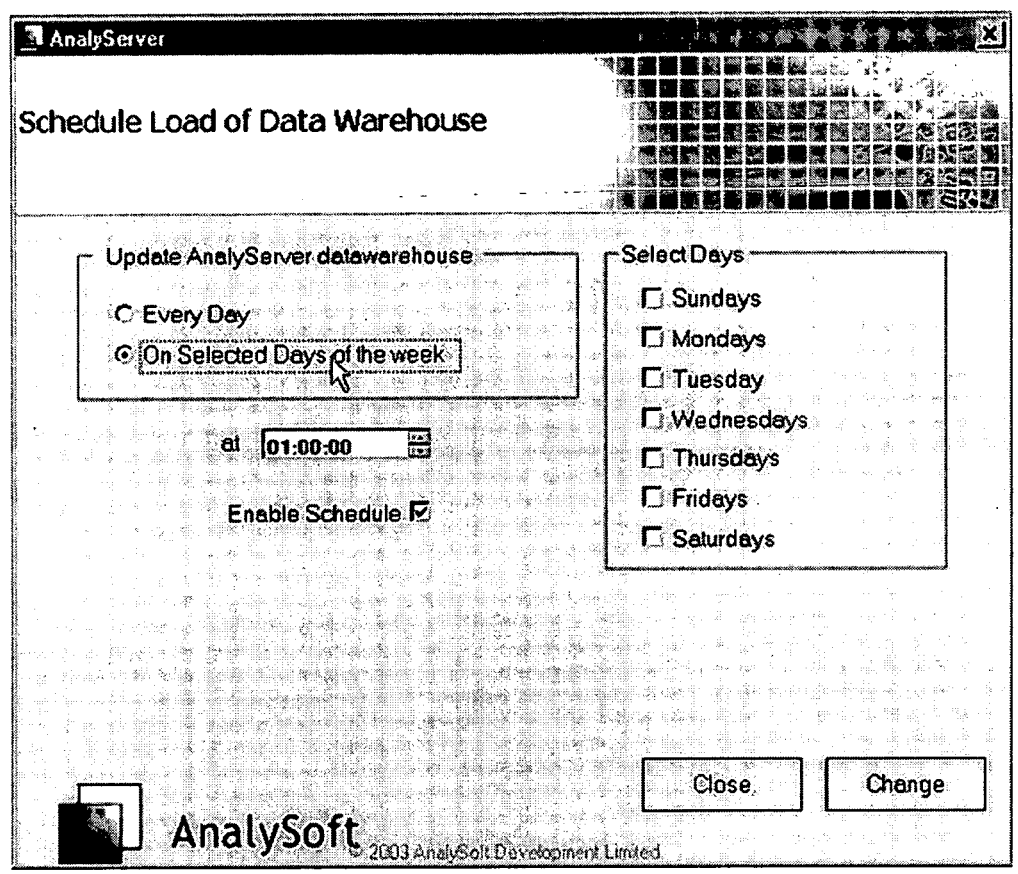

Certain other parameters are predefined and are controlled by values stored in an external license key file (which is provided during initial installation), for example:
The source (ERP) server name
The source (ERP) database name
The SQL server name
The SQL database name
The OLAP server name
The OLAP database name
Whether the ERP system utilizes a proprietary or relational database
A switch to use single or multiple companies In addition, certain other parameters can be set at installation time. These parameters are specified by the user and used by the Builder when it is executed. For example:
The data warehouse server name
The data warehouse database name (and the data file path if not the default)
Which ERP system companies to include in the data warehouse and OLAP cube Any extra dimensions (e.g. Navision Advanced Dimensions) and names they choose to give them The days of the week and time of day that the periodic update process will be executed FIGS. 12-15 depict various screenshots from a particular implementation of the invention, showing the Builder user interface screens for entering some of the above parameters. For example, the ERP server name, database name, user name, and password (FIG. 12); the OLAP server name and database name (FIG. 13); which extra dimensions to include in the OLAP cube (FIG. 14); and the day and time of the automatic periodic update will occur (FIG. 15).

By changing the various parameters described above, the same XML file may be used (unchanged) for different installations. Additional modules or companies can be added by simply by executing a different subset of the stored procedures as specified by internal switches in the XML.

In this exemplary implementation of the invention the Builder is written to loop multiple times through a series of scripts to create multiple sets of stored procedures (for example, once for each company in the ERP system), altering each set of stored procedures slightly on the basis of the structures and data in the ERP system. These sets of stored procedures, when executed, will perform all the operations necessary to populate the appropriate tables and fields in the data warehouse (as described in steps 1 & 2, above).

A separate section of the XML file contains a script to generate and reprocess an OLAP cube. This script is modified based on the appropriate metadata and data from the underlying data warehouse (see step 3, above), in order to create a cube which reflects the elements and structure of the source data.

So in total the XML file consists of:
SQL Queries to determine versions, naming conventions etc.;
Stored procedure templates which are looped through to create the stored procedures on the server;
The OLAP cube definition.
Definition of the periodic update Once the Builder has finished executing the create procedure SQL statements it then goes on to read the OLAP cube definition XML and generates the OLAP cube—in this exemplary implementation by using Microsoft Analysis Services Decision Support Objects (DSO). The XML file also contains all the scripts needed to create the periodic update (see step 6, below) and the penultimate step in the update process is the execution of a program script which processes the OLAP cube.

The Builder is executed to install the system initially. It may be executed again to upgrade the system or to modify it in response to upgrades of the external ERP system.

This example implementation of the Builder demonstrates that this aspect of the invention is a unique and significant improvement over the prior art, in that the Builder dynamically generates stored procedures based on the structure of the ERP system and various other parameters. Also, the self-modifying nature of the stored procedures as previously described facilitates intelligent adaptation of the data warehouse and cube structure to the structure of the ERP system source data. Specifically this exemplary implementation of the invention does not require the use of Microsoft SQL Server Data Transformation Services.

3. Defining the Cube

Figure 11:
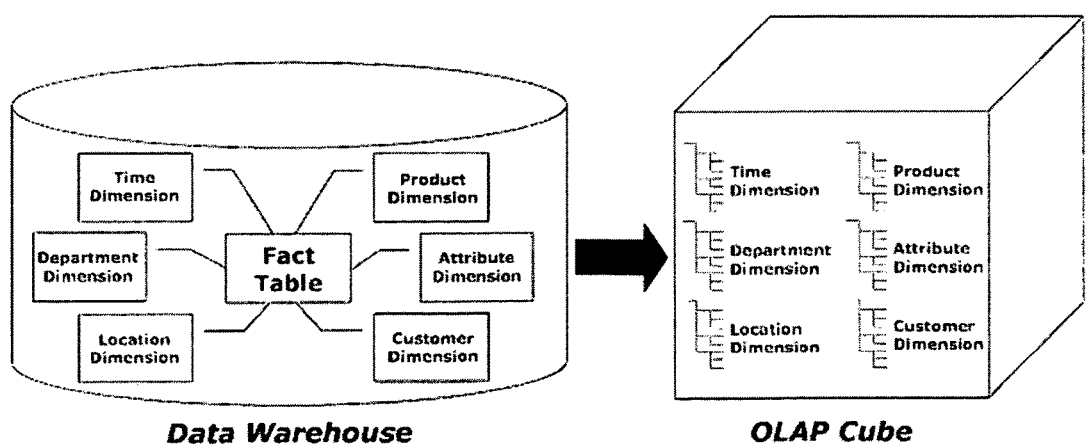
FIG. 11 shows a greatly simplified example of the dimension tables in the data warehouse being used to create the dimension hierarchies in the OLAP cube.
Figure 12:
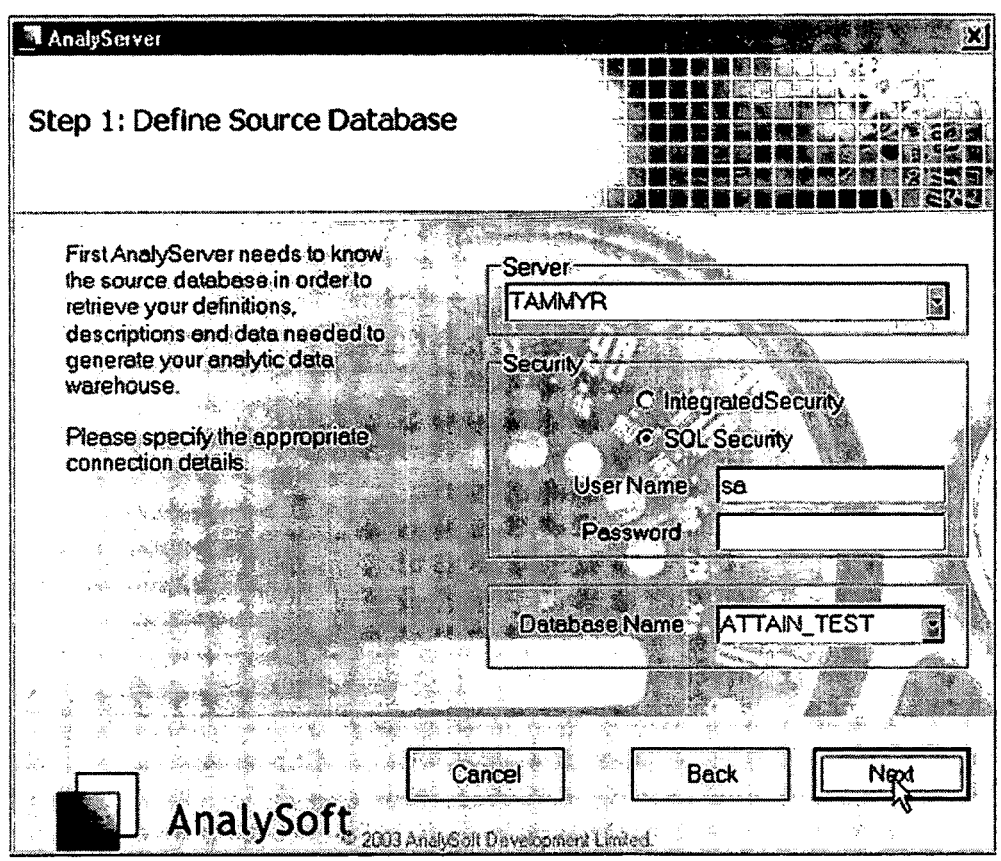
FIGS. 12-15 depict various example screenshots from a particular implementation of the invention, showing the user interface screens for entering certain configuration parameters.
Figure 13:
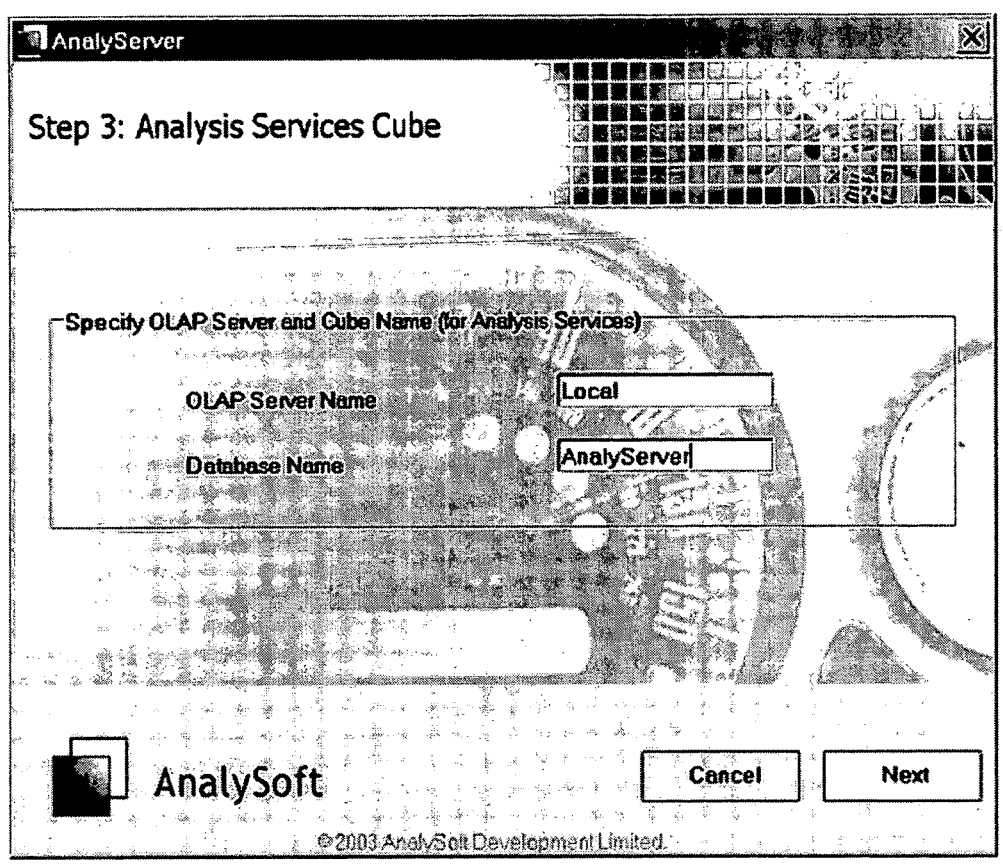
Figure 14:
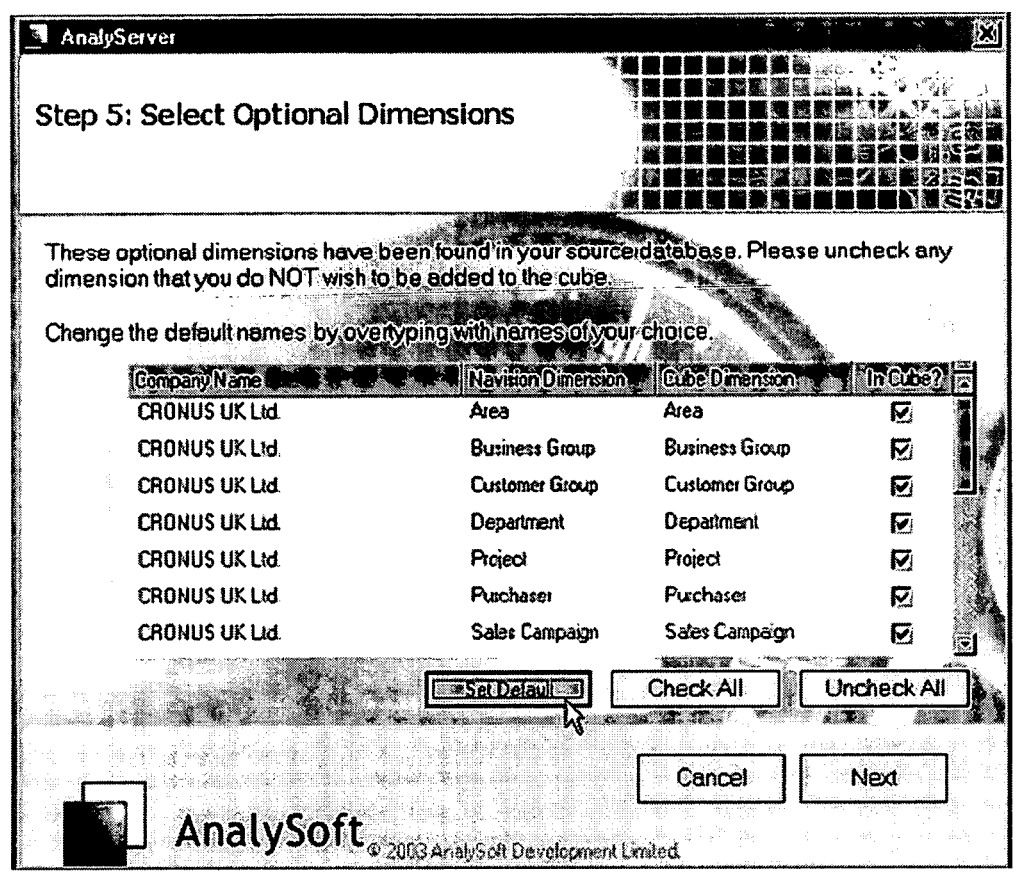

In this implementation of the invention, additional stored procedures are executed against the data warehouse to determine the various metadata structures required for an OLAP cube to facilitate analysis and reporting of the data. These stored procedures execute queries to determine and identify the following metadata in the data warehouse:
The dimension names
The fields containing the member names for each dimension
The hierarchies of the members in each dimension This process is represented (in highly simplified form) by FIG. 11.

The Builder program (see step 4, below), when first executed, will create the metadata structures required to define an OLAP cube. When the cube is created (and subsequently refreshed), these structures are updated with the actual dimension, member, and hierarchy information retrieved by these queries from the data warehouse.

4. Populating the Data Warehouse

A significant improvement in the present invention over the prior art is the inclusion of data from many ERP system ledgers in a single data warehouse and cube (instead of creating multiple "stovepipe" data marts). This process is described as a Hyperjoin. Such a Hyperjoin is made possible by including references to other ledgers in the data warehouse, as described above. Therefore, instead of analysis and reporting being performed on many individual OLAP cubes it can be performed against one cube (in a typical exemplary implementation the invention can replace 20 or more individual cubes with a single cube of 30-60+ dimensions). This exceptional functionality permits analysis and reporting across all areas of a business without the need to perform complex joins between multiple different data marts or OLAP cubes, thus avoiding the need for users to possess significant technical or accounting knowledge.

The inclusion of data from different ERP ledgers into a single cube provides users with superior reporting and analysis functionality. Some examples of the types of reporting and analysis that can be produced from the invention are:
Product/Customer/Salesperson analysis against the Chart of Accounts
Aged Credit and Aged Debt comparison to obtain overall health of company
Complete Item/Customer profit calculated including adjustments, cost of materials and indirect costs
Dashboard style information on each customer including outstanding orders, debt, invoice history, suppliers and warehouses used to fulfill orders.
Full product analysis including orders, stock, previous sales, cost adjustments etc
Discount analysis by product/customer/salesperson/etc
Status of orders, including quotes
Asset Management
Cash Flow planning and reporting In this implementation of the invention, stored procedures are either executed to extract the data stored in the temporary staging tables (if they were necessarily created in the previous step of the process), or directly against the ERP system tables (in the event that the ERP system already utilizes a Microsoft SQL Server database). This data is then used to build and populate a data warehouse in the form of a snowflake schema (i.e., a central fact table and a series of linked dimensional tables with additional detail tables linked to them).

On completion of this process, the data warehouse will contain both summary and detailed data from the source ERP system representing a comprehensive snapshot of the data in the ERP system at the time of the original data extract.

Unlike commonly used methods and processes for building a data warehouse which are familiar to those skilled in the art, this invention describes a number of significant improvements over the prior art which permit and facilitate certain valuable kinds of business analysis and reporting as described herein.

In one exemplary implementation of the invention, during the process of populating the data warehouse from multiple ERP system ledgers the data is manipulated by performing SQL joins to create detail rows in the fact table, which also hold summary information. For example, in the ERP system a single sales invoice might have four lines, and would be represented by a single row in the GL (and the Accounts Receivable ledger also). In this case the GL summary line would be joined to the 4 invoice lines and create four rows in the resulting fact table, including in each row a combination of analysis information from the GL row and the invoice line. This is to facilitate subsequent analysis and reporting against both the summary and detailed data when it is transferred to the data warehouse, and represents a significant improvement over the prior art.

Figure 4:
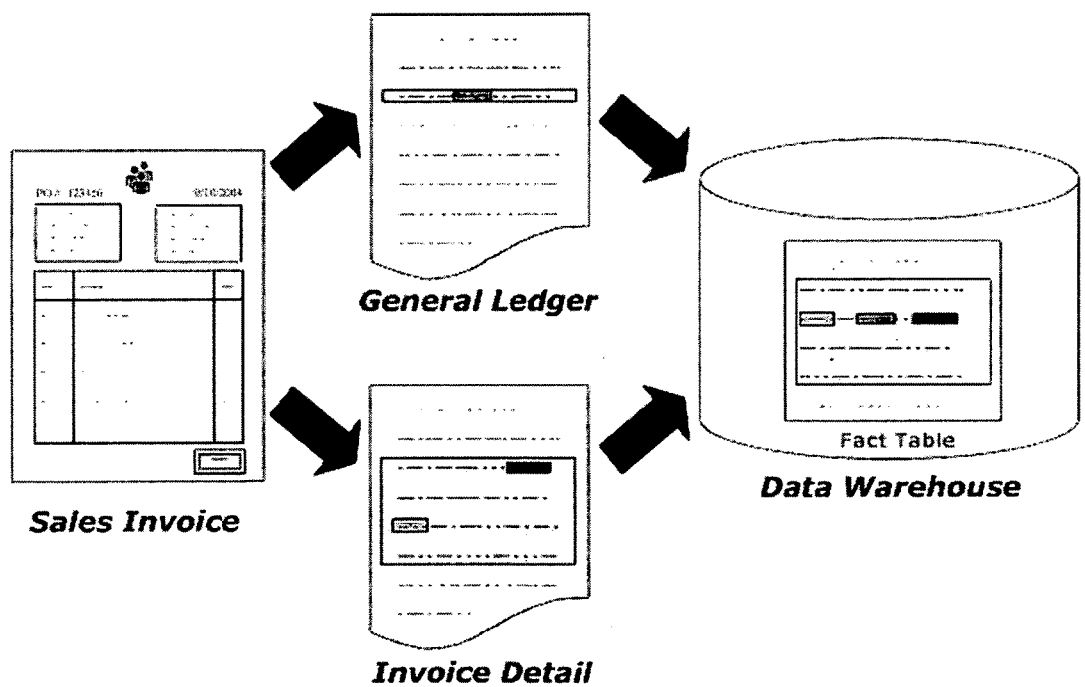
FIG. 4 is a schematic depiction of how the information contained in an example sales invoice would be represented in the ERP ledgers, and eventually, the data warehouse.

FIGS. 4-9 show a simplified example illustrating this process. FIG. 4 is an overview of the data flow in this example from a sales invoice to the data warehouse. Items of data from the sales invoice (see FIG. 5), such as the purchase order number (PO #) and the invoice date are stored as a single row in the GL (see FIG. 6) Other data items from the sales invoice, such as the order quantity (Qty), the item code (SKU), and the unit price are stored as multiple rows in the invoice detail ledger (see FIG. 7) Costs and cost adjustments relating to the products sold are held in the inventory (see FIG. 8). The data from the GL and invoice detail and inventory is combined to create multiple rows in the data warehouse fact table (FIG. 9), incorporating both general information and detail lines from the invoice. Note that the cost adjustments appear against the original date of the invoice allowing for margin analysis of invoices by period (even though the adjustments may have occurred in subsequent periods).

The building of the data warehouse dimension tables is performed by extracting the relevant metadata for each dimension in turn and copying it directly into the dimension tables in the data warehouse, with the exception of posting account data, financial period data, and certain custom data (for example, Navision Advanced Dimensions) which are dealt with by a more sophisticated process. During the extraction of the dimension information, any totaling structure information stored within the ERP data for accounts, financial periods and advanced dimensions is used to create appropriate hierarchies. For example, in the Accounts dimension within the ERP system, posting accounts may be grouped into total assets, total liabilities, total revenue, and so on; these same groupings are used to create hierarchies for these dimensions in both the data warehouse and the OLAP cube.

In this exemplary implementation, the data warehouse fact table is created by extracting transactional data from the ERP system or the staging tables (as appropriate) into a set of intermediate tables which are then manipulated via a multi-stage process before arriving at the completed fact table. During this process, the invoice and credit memo records for both Accounts Receivable and Accounts Payable ledgers are inserted into a single table to create an intermediate table representing line details for sales/purchasing invoices/credit memos (referred to as the InvoiceCredit table).

The Accounts Receivable/Payable ledgers contain lines which are not necessarily generated by an invoice or credit and yet which have useful analysis fields (e.g. Customer No). In addition, certain other subledger analysis fields are only held at an Accounts Receivable/Payable level and not at an invoice/credit level. Because of this, an additional intermediate table (the ExtraSubLedger) is created to allow this information to be included.

Figure 10:
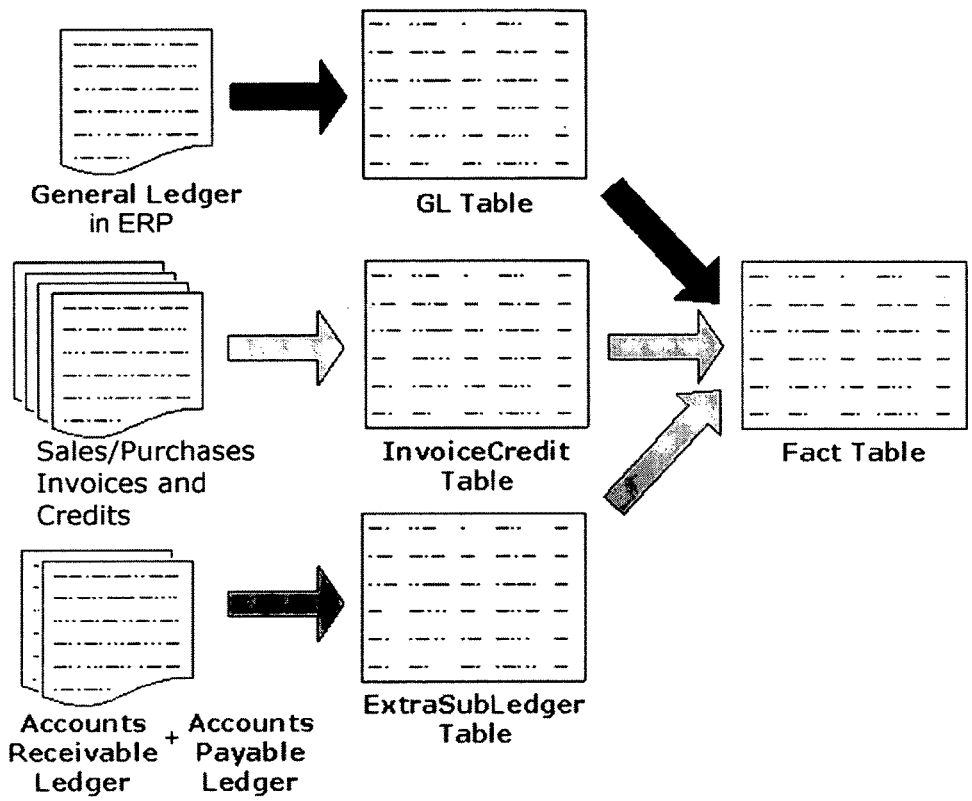
FIG. 10 schematically depicts the process of creating the fact table from the data warehouse by using intermediate tables.

The GL, InvoiceCredit and ExtraSubLedger tables are then joined together to form the basis for the fact table. In the case of the GL to InvoiceCredit join, there is a one to many relationship, so where a match exists the GL information is expanded by the addition of extra rows to include the detailed information from the other tables. In the case of the GL to ExtraSubLedger join, there is a one to one join and the additional analysis fields stored at subledger level are combined with the GL lines (via a SQL Join) to allow further analysis in the resultant fact table. FIG. 10 illustrates the entire process of creating and joining these various intermediate tables to create the fact table.

For example, consider the case of an invoice within the ERP system with two detail lines (representing the specific items invoiced). In common accounting practice, this invoice would be held as three records within the GL, e.g. a Total record, a Goods record, and a Tax record. However, joining the GL and the InvoiceCredit tables in the above exemplary implementation would result in four records in the resultant fact table, i.e. a Total record, the Goods record split into two (to represent the two separate invoice lines), and the Tax record. Any line analysis fields such as Salesperson, Item and Customer would also be included in the fact table as a result of this join to the invoice and would be available for detailed analysis in the OLAP cube. By including Accounts Receivable ledger data in the ExtraSubLedger, it can be joined to the Total, Goods and Tax lines to allow analysis of the extra analysis fields from the subledger across all the appropriate GL lines.

As a further example, a journal from a subledger would usually be represented in the GL by two records (each balancing the other out). The journal information would be stored in the ExtraSubLedger table. The join between the ExtraSubledger and the GL in this exemplary implementation would not increase the number of records, so the fact table would also contain two records. However, this join allows the capture of subledger analysis fields such as Salesperson and Customer in the relevant records of the fact table, thus providing a significant benefit over the prior art in terms of the potential information that is made available for analyses and reports.

Many other tables holding transactions are also joined to the GL, InvoiceCredit and ExtraSubLedger at this point to provide further analysis fields. The most notable of these are the inventory tables, fixed asset ledgers, and bank account ledgers. For example, the cost of sales lines and stock lines in the GL can be joined to the inventory to produce full product margin analysis and stock analysis.

The fact table created in the above example of the invention does not simply consist of a list of keys linked to the dimension tables and a set of the relevant measures; it is significantly different to conventional implementations using the prior art in that it retains some detailed analysis/descriptive information. This includes fields such as Document Number, Document Type, GL Description, Subledger Description, Invoice Line Description, Order Number, External Document Number, Order Date, etc. These fields are subsequently used to provide drillthrough functionality to the detail level data, to provide enhanced member properties, and also to permit the creation of additional dimensions linked to the fact table to assist in identifying the origin of a transaction.

It will be clear from the above examples to those skilled in the art that the invention provides a significant improvement over the prior art, in that an end user can perform analysis and reporting against both summary and detail transactional data simultaneously, without having to understand either accounting principles or the underlying structure of the ledgers and tables in the ERP system or the data warehouse.

In order to ensure that all the ledger information has been combined correctly there are stored procedures which check the resulting account balances in the data warehouse against the equivalent balances in the ERP system. Thus the invention contains its own error checking and data validation, the results of which can be reported to the implementation or support team via a Diagnostic Support Web Service.

In addition, another significant improvement over the prior art is the inclusion in the data warehouse of ERP system transactional data that is posted to the individual ledgers but for which information is not usually held on the GL itself. By joining the GL back in with the subledgers we can gain further analysis on the GL. Examples of this type of data include:

Unreconciled entries posted to the bank account ledger (also called the cash book);
Remaining amount (unpaid) invoices and unallocated payments or credits in originating currency and base system currency;
Aging data from both purchase and sales invoices to allow cashflow analysis.

Also included is information that has no current record in the financial ledgers or data which has no net financial impact on the GL, but which still may be useful for analysis purposes. Examples of this type of data include:

Unfulfilled orders, i.e. sales/purchase orders and quotes that have been input into the ERP system but not yet invoiced (and so not yet posted to the financial ledgers);
Sales of items which are discounted 100% and Free of Charge items;
Budget data;
Stock movement not resulting an in GL posting, therefore allowing accurate stock quantity analysis.

5. Executing Periodic Updates

In a normal business environment it is necessary to periodically refresh both the metadata structures and the data within the data warehouse and the OLAP cube as the ERP system data changes (there are many new transactions stored in the ERP system every day, and also potentially changes to the ERP ledger structures, for example because of the addition of a new product line or a new customer). Such updates are typically performed automatically on a regular basis (e.g. daily), and, because they may cause interruptions in the availability of the data warehouse and the OLAP cube, they are often performed overnight.

In one example of this invention, when a periodic update is automatically triggered it will execute certain stored procedures which will scan through the ERP ledger data and recreate the staging tables and the data warehouse, and refresh the data in the OLAP cube in a manner similar to that described in steps 1 through 3, above (except that the data warehouse and/or cube may be refreshed rather than rebuilt from scratch). The process of updating the data warehouse may be either a total rebuild (i.e. deleting the contents of the data warehouse tables and recreating them) or an incremental update (i.e. leaving the data warehouse table contents intact and simply including information from the ERP system which is new or changed since the last periodic update, as required). The incremental update can either update information across the whole data warehouse, or can just be an update of the General Ledger transactions—this facilitates Month End journal reporting.

In this automatic update process, the stored procedures may uncover new items which appear in the ERP transactional data but not in the data and/or metadata in the data warehouse and OLAP cube. These new items usually fall into one of the following categories:

1. A New Data Value has been Added, e.g. a New Customer:

The new customer will automatically get added to the associated grouping in the Customer dimension without any user intervention. The new customer will appear in the dimension after the next periodic update.

2. A New Data Value that might change the Structure, e.g. the Accounting Period Table has Rows Added for Weekly Reporting (in Addition to Years & Months)

The dimension table is rebuilt with each periodic update, so it will be automatically rebuilt with the new structure. The new structure information will appear in the OLAP cube after the next periodic update (e.g. the user will see the weeks as well as years and months in their time dimension).

The final step in the automatic update process is to call a Diagnostic Support Web Service and request a set of SQL queries. This final step is always executed, even if the preceding steps fail. The queries supplied by the Web Service are run against the data warehouse to check for errors, or to capture general diagnostics. Once the queries have been executed the results are posted back to the Web Service via the Internet and stored in a database owned by the implementation/support team. These postings can trigger email notifications to alert the implementation/support team of any potential problems. Examples of the queries executed are: Checking for discrepancies in account balances, checking the update process ran through successfully, reporting the time which the update process took to complete, etc.

6. Customizing the Data Warehouse

The XML input file as described in Step 2 contains stored procedures that are created in the data warehouse to accommodate future customizations. For example, an ERP system may have been customized to include an extra analysis field such as Product Range. A standard data warehouse implementation in the field of the invention would require highly trained technical staff with a working knowledge of the data warehouse and ERP structures and platforms in order to add this field for analysis by the end user.

One aspect of the present invention is a set of stored procedures that take as parameters a list of new fields to be added to the data warehouse. The stored procedures then loop through this list of fields and add them in to the correct tables in the star schema in the data warehouse. A further tool, known as the Architect, adds new dimensions to the OLAP cube based on these fields. Thus no technical knowledge or consultancy is required to add many kinds of new fields to the data warehouse implementation (i.e. those fields from the source that exist on tables already utilized within the data warehouse structure).

The Architect tool also enables other changes to be made to the OLAP cube without the need for expertise with Microsoft SQL Server Analysis Services.

CONCLUSION

From the above description, it will be obvious to those familiar with the art that the invention disclosed herein provides a novel and advantageous system and method for automatically extracting data from an ERP system and creating a data warehouse and OLAP cube for management analysis and reporting. The foregoing discussion discloses and describes merely one example of the possible methods and embodiments of the present invention. Those familiar with the art will also understand that the invention may be embodied in other specific forms without departing from its essential characteristics. For example, the Builder might be equally written in another programming language, such as C/C++/C#/Visual Basic or Java program, and the stored procedures replaced by Java methods or equivalents. Accordingly, this disclosure of the present invention is intended to be illustrative, but not limiting, of the scope of the invention, which is set forth in the claims herein.

The invention claimed is:

1. A method of constructing a data warehouse that combines data from multiple financial accounting transactional ledgers into a single fact table; including the following steps of:
   (a) connecting to an Enterprise Resource Planning (ERP) data store that stores the multiple financial accounting transactional ledgers, wherein
      the multiple financial accounting transactional ledgers are a classification and summarization of financial transactions, and
      the multiple financial accounting transactional ledgers include General Ledger, legally required for audits, and one or more of the following ledgers: Sales (Accounts Receivable), Purchase (Accounts Payable), Invoice (Order Processing), Inventory, and Fixed Assets;
   (b) using Structured Query Language (SQL) scripts to extract and combine data from the multiple financial accounting transactional ledgers existing in the ERP data store, including the general ledger, to automatically create and populate a single fact table in the data warehouse which integrates transactional data from the multiple financial accounting transactional ledgers;
   (c) generating, from the data warehouse, an associated, single physical Online Analytical Processing (OLAP) cube such that the single physical OLAP cube enables cross-functional analysis of data from the multiple financial accounting transactional ledgers;
   (d) executing stored procedures against the data warehouse to determine various metadata structures required to create or update the single physical OLAP cube to facilitate analysis and reporting of the data, wherein
      the stored procedures take as parameters a list of new fields to be added to the data warehouse, and
      the stored procedures loop through the list of new fields and add each field in the list into appropriate tables in a star schema in the data warehouse.

2. The method of claim 1, in which the step of constructing the data warehouse or the step of generating the single physical OLAP cube is achieved without significant human intervention using software.

3. The method of claim 2, in which the data warehouse is a generic warehouse that is capable of being modified without technical knowledge of the software or data structures.

4. The method of claim 2, in which the single physical OLAP cube is a generic OLAP cube that is capable of being modified without technical knowledge of the software or data structures.

5. The method of claim 1, in which the data warehouse is created using SQL joins from the multiple financial accounting input transactional ledgers to generate additional, detail rows in the single fact table.

6. The method of claim 5, in which the SQL joins are made between one or more of the following financial accounting source transactional ledgers or modules:
   (a) the General Ledger and inventory/stock;
   (b) the General Ledger and sales/purchase ledger;
   (c) the General Ledger and invoice/credit.

7. The method of claim 5, in which orders and other entries that do not have a financial impact to the General Ledger are placed into the single fact table.

8. The method of claim 5, in which invoice and credit memo records for both the Accounts Receivable and the Accounts Payable ledgers are joined together via a SQL command to create an intermediate InvoiceCredit table representing line details for sales/purchasing and/or invoices/credit memos.

9. The method of claim 8, in which information in the Accounts Receivable/Payable ledgers that is not necessarily generated by an invoice or credit is included in an additional intermediate ExtraSubLedger table.

10. The method of claim 9, in which the General Ledger, the InvoiceCredit and the ExtraSubLedger tables are then joined together to form the single fact table.

11. The method of claim 10, in which the single fact table includes fields functionally equivalent to one or more of the following fields: Document Number, Document Type, General Led Description, SubLedger Description, Invoice Line Description, Order Number and External Document Number.

12. The method of claim 10, in which one or more of the following tables holding transactions are also joined to the General Ledger, InvoiceCredit and ExtraSubLedger to provide further analysis fields: inventory tables, fixed asset ledgers, and bank account ledgers.

13. The method of claim 1, in which fields in data warehouse tables are dynamically updateable in that the fields change in accordance with an underlying ERP accounting structure and system data when the warehouse is updated with a new snapshot of ERP system data.

14. The method of claim 1, in which the stored procedures execute queries to determine and identify one or more of the following types of metadata in the data warehouse;
   (a) dimension names;
   (b) fields containing member names for each dimension;
   (c) hierarchies of members in each dimension.

15. The method of claim 14, in which the application is written to loop multiple times through a series of scripts to create multiple sets of the stored procedures, altering each set of the stored procedures slightly based on the structures and data in the ERP system.

16. The method of claim 14, in which the stored procedures are defined in an XML file.

17. The method of claim 14, in which, when a periodic update is automatically triggered, the application will execute certain stored procedures which will scan through ERP ledger data and recreate the data warehouse, and refresh the data in the single physical OLAP cube.

18. The method of claim 1, in which an application uses an Extensible Markup Language (XML) the containing instructions for creating multiple stored procedures which; when executed, initiate and control a process whereby the relevant and appropriate data is extracted from the ERP system into the data warehouse and the single physical OLAP cube.

19. The method of claim 18, in which the stored procedures initially exist in the file in a generic state, but structure of the stored procedures is changed dynamically at runtime, according to the responses given by a user during installation of the application.

20. The method of claim 18, in which the application determines dynamically, and utilizes during the installation of the application, one or more of the following:
  (a) ERP system product version;
  (b) table/field naming convention used;
  (c) any other naming differences between product versions;
  (d) number of levels of totaling within the account hierarchy;
  (e) granularity of financial periods used.

21. The method of claim 18, in which the stored procedures are adaptive and will change execution strategy according to changes in any of the following parameters:
  (a) installed version of the ERP system;
  (b) table and field structure of the ERP system;
  (c) internal switches within the XML file;
  (d) external switches in an external license key file.

22. The method of claim 1, in which an application adds new dimensions to the single physical OLAP cube based on the list of new fields.

23. The method of claim 1, in which results of error checking can be automatically reported to an implementation or support team via a Diagnostic Support Web Service.

24. The method of claim 1, in which one or more of the following types of reporting or analysis is performed within the single physical OLAP cube:
  (a) Product/Customer/Salesperson analysis against the Chart of Accounts;
  (b) Aged Credit and Aged Debt comparison to obtain overall health of a company;
  (c) Complete Item/Customer profit calculated including adjustments, cost of materials and indirect costs;
  (d) Dashboard style information on each customer including outstanding orders, debt, invoice history, suppliers and warehouses used to fulfill orders;
  (e) Full product analysis including orders, stock, previous sales, cost adjustments;
  (f) Discount analysis by product/customer/salesperson;
  (g) Status of orders, including quotes;
  (h) Asset management;
  (i) Cash flow planning and reporting.

25. The method of claim 1, in which the multiple financial accounting transactional ledgers relate to one type of information.

26. The method of claim 1, in which, in order to ensure that all ledger information from the ERP system has been combined correctly, comparing resulting account balances in the data warehouse against corresponding balances in the ERP system.

* * * * *